Sept. 20, 1955 L. PARKER ET AL 2,718,461
METHOD OF LEACHING AND FELTING GLASS FIBER
Filed Aug. 2, 1954 2 Sheets-Sheet 1

INVENTORS.
LEON PARKER & ROBERT C. NORDBERG
BY
Philip Subkow
ATTORNEY.

Sept. 20, 1955 — L. PARKER ET AL — 2,718,461
METHOD OF LEACHING AND FELTING GLASS FIBER
Filed Aug. 2, 1954 — 2 Sheets-Sheet 2

INVENTORS.
LEON PARKER & ROBERT C. NORDBERG
BY Philip Subkow
ATTORNEY.

United States Patent Office 2,718,461
Patented Sept. 20, 1955

2,718,461
METHOD OF LEACHING AND FELTING GLASS FIBER

Leon Parker, Burbank, and Robert C. Nordberg, Los Angeles, Calif., assignors to H. I. Thompson Fiber Glass Co., Los Angeles, Calif., a corporation of California Application August 2, 1954, Serial No. 447,204

7 Claims. (Cl. 41—42)

This invention relates to improvements in leaching siliceous glass fibers to remove non-siliceous portions of the glass results in fibers which are high in silica and particularly pure silica. Procedures for the production of such fibers are described in the Parker et al. Patents Nos. 2,491,761, 2,500,092; 2,624,658; and, Parker Patent No. 2,635,390.

This invention relates to an improved procedure for leaching fibers.

In the procedure of our invention the loose fibers are packed into a container and acid or other leaching agent is circulated therethrough. By this procedure, we maintain a low weight ratio of acid to fiber during the actual contact between the acid and fibers. Consequently, we are enabled to use smaller leaching tanks than if we carried out the entire leaching operation in one step by immersing of the fiber in the entire batch of acid to be employed in the leaching operation.

Additionally, we may control the rate of extraction and the salt content of the leaching agent by proper dilution or reinforcement of the leaching acid, and thus obtain improved fiber and a more rapid completion of the leaching operation.

It is a further object of our invention to control the temperature of the reaction so as to maintain the reaction, at least near its stage of completion, as high as practicable, but preferably below the boiling point of the acid employed.

We have observed that because of the high ratio of fibers to acid employed in our procedure the reaction is sufficiently exothermic so that the acid is heated during the reaction and that the temperature of the acid increases at the early portion of the reaction and then decreases.

It is therefore an object of our invention to control the temperature of the reaction so that the temperature rise obtained during the reaction does not raise the temperature of the liquid to its boiling point.

Figure 1:
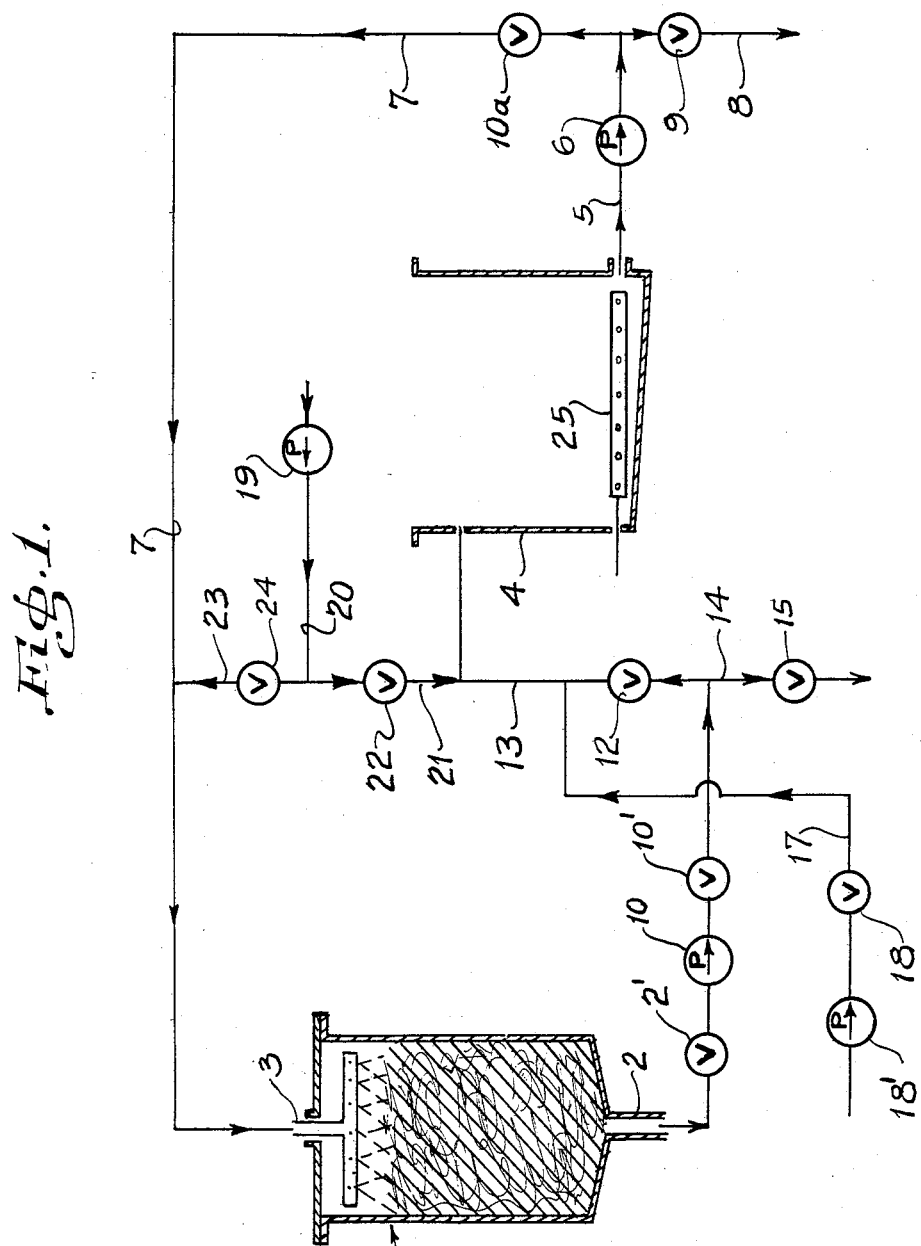
Figure 2:
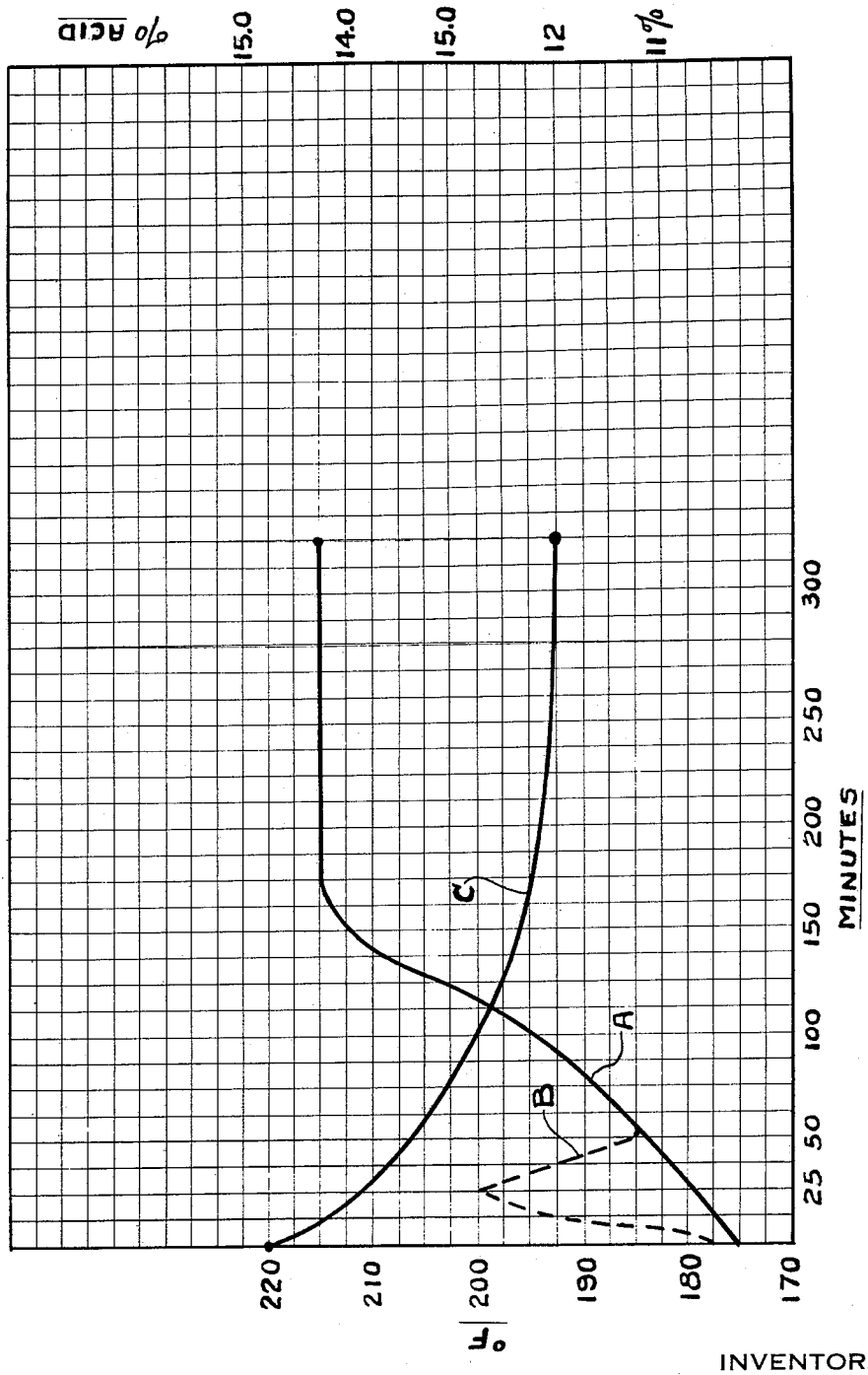

These and other objects of our invention will be further described in connection with the description of our invention taken together with the drawings, in which Fig. 1 is a schematic flow sheet of the process according to our invention; and Fig. 2 is a chart of the concentration and temperature of the acid during leaching according to our procedure.

A tank made of acid resistant material such as wood is connected at its bottom by a pipe 2 controlled by valve 2' and by pump 10 and valve 10' to an acid resistant tank 4 via a valve 12. Liquid from tank 4 may be circulated via pipe 5 and pump 6 via pipe 7 and valve 10a into and through the spray pipe 3 which acts to uniformly distribute the incoming liquid over the entire upper cross section of the tank 1.

A by-pass 8 is provided controlled by valve 9 and connected to the discharge of the pump 6. A by-pass 14 controlled by valve 15 is also connected to the discharge of pump 10 between the pump and valve 12. Pump 18 is connected by means of line 17 controlled by valve 18 to the pipe 13. Pump 19 is connected by pipe 20, either to line 7 by means of pipe 23 and valve 24, or to line 13 by means of pipe 21 and valve 22.

Tank 4 may be an open top tank if desired or closed by a suitable top closure and may be heated by open steam injected through perforated pipe 25.

In operating our process, we employ glass fibers similar to that employed in the process described in the Parker et al. Patent No. 2,491,761, or as employed in the process described in Parker Patent No. 2,635,390.

As an example of the fibers which we may employ are the so-called E fibers sold by the Owens-Corning Co. and more completely identified in the aforementioned patents.

We may use the blown fibers of the form usually used for making either resin bonded or unbonded batts of fibers in the conventional commercial operations where the blown fibers are blown into a chamber where they are deposited on screens.

The fibers may be of any desired length and may be either loose or in wads or in batted form, preferably however, not resin bonded. The mass of fiber is placed in the tank 1 to the desired level.

Where leached fiber is to be employed to form batts by a felting technique, such as is described in Parker Patent No. 2,635,390, we prefer to employ fibers having a length less than 2 inches, and for purposes of obtaining structurally strong batts the length should be greater than ¼" in length. A suitable length is, for example, about ½ to 1" in length.

While batted or bulk blown fiber may be used, we prefer, when fibers of the above short lengths are used in the felting technique in order to obtain a greater uniformity in length, to employ drawn fibers. Such fibers are of the kind that are conventionally twisted into thread or yarn and wound on reels or cobbs, as conventionally employed in making woven or knitted glass fiber fabrics. The fibers or the threads are cut to the desired length, and uniformity of size is thus obtained as described above. For the purposes of this invention, we prefer to use the fiber as produced prior to twisting into yarn. We have found that ¾ to 1" length fibers are suitable for our purposes.

We have found that by employing such fibers, particularly when cut to the above lengths, it is desirable to enclose the fibers in a porous bag or container made of material similar to that used to wrap the batts in, as disclosed in Parker et al. Patent 2,500,092. We have found that a suitable material is Dynel cloth, that is, cloth woven from a synthetic vinyl chloride acrylonitrile copolymer fiber manufactured by Carbon & Carbide Co. The glass fiber may be placed into a plurality of bags made from the above cloths and closed, and the bags placed in the tank. Alternatively, a bag equal to the dimension of the tank may be placed as a liner in the tank, the bottom of the bag resting on the bottom of the tank and the bag walls extending upward along the sides of the tank, preferably above the fluid annd fiber level in the tank. The sides of the bag may be suitably secured to the top of the tank by clamps, pins or other securing means.

The purpose of the bag is to act as a filter to prevent escape of fiber through the discharge outlet 2, and also to facilitate the removal of the fibers from the tank.

We have discovered that we may increase the bulk density of the fibers in tank 1, i. e., the total weight of fibers which we can place in any given volume, by wetting the fibers. Thus, after the fibers are placed in the bag, or bags, water may be sprayed through nozzle 3 by pumping water by pump 19, valve 23 being open and valve 22 and 10a closed. The water thoroughly wets the fibers and may be discharged from the bottom of tank 1, via line 2, pump 10 and line 14, valve 12 being closed and valves 15, 10' and 2' being open.

When the fibers are thoroughly wetted they may be compressed. When a plurality of cloth bags are employed they will deform, permitting such compression. This compression permits the addition of additional fiber which then may also be wetted and compressed. The degree of compression obtainable is quite large. Thus, about three times the weight of fiber may be placed in tank 1 when packed as described, compared to the weight of dry fiber which can be placed in a like volume in tank 1.

This increase in the weight of the fiber results in a compaction of the fiber without an increase in resistance to the flow of liquid in an amount to interfere with the effective flow of liquid. In order to limit the flow resistance resulting from compaction, we limit the weight of dry fiber added to the tank so that on compaction the flow resistance to the liquid does not become excessively high.

We have found that this procedure permits a packing of the fiber to a bulk density of about 15 to 25 pounds per cubic foot without introducing excessive flow resistance. This represents a ratio of volume of liquid in the interstices of the packed fiber to the volume occupied by the fiber of about 10 to about 5.

Shortly after the start of leaching, the fibers undergo a further slumping increasing the bulk density of the fiber to a volume of from the above value of 15 to 25 pounds per cubic foot to a bulk density of about 30 to 55 pounds per cubic foot without introducing excessive resistance to the flow of the leaching solution. This higher bulk density represents a volume ratio of acid to fiber of from about 4.5 to about 2.

An additional but important advantage resides in the economy thus obtained. The same size apparatus and the same man power can be used to treat larger weights of fibers thus cutting down the unit cost of the treated fiber.

When the tank has been filled to the desired level and the water drained off through line 2 and line 14, with valves 9, 15, 18, 22 and 24 closed, acid is circulated via line 5, pump 6, through line 7, and via sprays 3. The acid is distributed uniformly over the top of the fibers and percolates through the fiber, and collects in the bottom of the tank which may be made sloping to the discharge line 2. Pump 6 may be operated so that the rate of feed is sufficiently great to cause accumulation of liquor in the tank to cause a fluid level to be established above the fibers and thus the rate of discharge, i. e., pumping rate by pump 10 and pump 6 adjusted to maintain such a fluid level. However, this is not necessary and no liquid head above the fiber need be maintained. The hydraulic head on the fiber, resulting from the static head of liquid in the tank or resulting from the dynamic head arising from the flow of liquid, is maintained at a value so that the compaction of the fiber does not increase the flow resistance excessively.

The acid strength employed may be such as is used in the aforementioned Parker patents and the temperature may be as there stated. We may use any of the acids previously employed in the prior art, to wit, $H_2SO_4$, $HNO_3$, trichloracetic acid. However, we prefer to use the mineral acids which give soluble salts and prefer to use aqueous hydrochloric acid solution.

We have found that when we desire to employ the fiber to form batts, as described above, we may employ acid strength varying from about 10 to 15% by weight of HCl, and temperatures ranging from about 150° F. up to, but not at, the boiling temperature of the acid.

We have found that the reaction between the acid and the fiber is exothermic. Under these conditions of the operation of our invention, the ratio of fiber to acid in contact with the fiber is high. Thus, the ratio of volume of acid solution to volume of fiber in contact with the acid ranges for the bulk density, as previously stated, from about 10 to 1 to 5 to 1 at the start of the operation and decreases to about 4.5 to 1 to about 1.5 to 1 for the range of bulk densities previously given as a result of the further compaction of the fiber shortly after the start of operations. The weight ratio of the acid solution in the interstices of the packed fiber to the weight of fiber thus ranges from about 6 to about 1 for the bulk densities given above, with the smaller ratio occurring at the end of the reaction. Because of this high ratio of fiber to acid, the temperature rise in the reaction vessel 1, due to the exothermic nature of the reaction, may, in the early stages of the reaction, become sufficiently large to cause boiling of the acid in the tank. Such a procedure reduces the efficiency of the operation since it displaces liquid from contact with fiber and is a health hazard. Additionally, the boiling may be so great as to actually cause boiling over of the liquid from the tank when an open tank is used.

However, it is desired to maintain the temperature of the acid in contact with the fiber as high as is conveniently possible under the conditions indicated. Therefore, we maintain the temperature of the acid in tank 4 such that the inlet temperature of the liquid exiting from spray 3 is at a sufficiently low temperature that the liquid, heated by the reaction with the fiber, discharges from 2 at a temperature below boiling. Thus, the temperature in tank 1 may be maintained below boiling. This autogenous reaction temperature rise by exothermic reaction occurs in the early stages of the operation and is associated with the leaching of the non-siliceous compounds of the glass. When these compounds have been largely but not entirely leached, the temperature rise becomes smaller and finally the inlet and outlet temperatures come close together; in fact, the discharge temperature may be less than the inlet temperature due to radiation losses.

When the top and bottom temperatures approach each other, indicating that the reaction in the tank 1 has reached a stage where the exothermic heat is not sufficient to dangerously increase the temperature, the temperature of the liquid in tank 4 may then be raised to approach the boiling temperature of the acid solution and the process is continued by circulation of the heated acid until the desired degree of extraction is obtained as described below.

The process is initiated at the desired relatively low temperature using the acid of desired concentration. The acid at any desired concentration is either pumped by pump 18' and line 17, line 13, valves 10', 22 and 12 being closed and valve 18 open or dumped directly into tank 4. Water may be pumped via 19, valves 24, 18 and 12 closed and valve 22 open, through line 21 into the tank 4. When the acid of proper concentrations has been established in tank 4, it is heated by open steam exiting through the perforated pipe 25. When the acid is heated to the desired temperature it may then be pumped via line 5, pump 6, line 7, valve 10a open and valve 9 closed, and then through line 7 as described above. The temperature of the acid in the tank 4 and in the outlet line 2 is taken. It will be observed at first that the temperature in line 2 rises above that in the tank 4. As the heated acid is introduced into the tank 4 the temperature of the tank rises but due to the large volume of the liquid in tank 4 it rises but gradually. As the process continues the difference between the temperature of the acid introduced into reaction tank 1 and the outlet temperature in line 2 diminishes and finally no significant temperature rise is observed.

As this point in the reaction is reached to closely approached, the temperature in the tank 4 may then safely be elevated by introduction of superheated steam into tank 4. The temperature in the tank is raised gradually to just below the boiling point of the acid solution, for example, in the case of HCl acid, above 200 to 220° depending on the acid concentration, and circulated at this temperature through the reaction vessel 1, the temperature of the liquid at the outlet and inlet of the tank 1 remaining substantially constant showing no substantial rise and may show a slight fall due to heat losses from the tank 1.

During the leaching operation in tank 1 the acid concentration drops due to neutralization of acid by the glass and also the salt concentration in the acid rises. The acid concentration in the tank 4 thus drops gradually and the salt concentration rises gradually in tank 4. However, if the volume of the liquid in tank 4 is large compared to the volume in tank 1, the acid concentration in tank 4 will fall from an upper value to a lower value both usable in the process and the salt concentration in tank 4 will rise but not sufficiently to seriously hamper the operation of the process. The circulation of acid is continued until the ratio of $SiO_2$ to the non-siliceous oxides in the glass is above about 9:1. The preferred silica content on an anhydrous basis is in excess of about 90%. Thus, a single charge of acid in tank 4 may be sufficient to treat one or more batches of fiber in tank 1.

The following example illustrates the above procedure and may be taken as illustrative of, but not as a limitation of, our invention.

Tank 1 was filled with E type fiber as above described and wetted down as above described and compressed to a bulk density of about 18 pounds per cubic foot. This is about twice the weight of fiber per cubic foot which dry fiber would occupy if the fiber were packed dry in the tank. As leaching progresses the fibers slump and compact in the tank and after 10 or 15 minutes of leaching, occupy about a third of the original volume.

The operation may be further described by reference to the charts of drawing Fig. 2.

Curve A illustrates a representative temperature schedule in degrees Fahrenheit of the acid in tank 4 during the course of the operation showing its change with time as the reaction progresses. Curve B illustrates a representative like temperature schedule of acid exiting through pipe 2 plotted against time corresponding to curve A. Curve C gives the HCl weight concentration of the acid in tank 4 plotted against time. These curves are illustrative only and made smooth to illustrate the trend of temperatures and concentrations and the characteristics of the process. The actual temperatures and concentrations and their variation with time will depend on the initial temperature and acid concentration in tank 4, the relative volumes of acid in tanks 1 and 4, temperatures maintained in the tank 1, the reaction conditions in the tank, and temperature losses from tanks 1 and 4.

The curves illustrate, however, the significant features of the process.

The weight ratios of fiber to acid in contact with the fiber is high. As the reaction progresses, the fiber slumps as stated, so that the fiber occupies a volume, for example, of about ⅓ its original volume and the weight of acid solution in contact therewith, i. e., that which occupies the free space about the individual fibers is about equal to the weight of the fiber. This compaction of fiber increases the weight ratio of fiber to the weight of said solution in the free spaces between the fibers.

The resultant heat of reaction thus heats the small weight of solution in contact with the fiber. Curve B shows that the acid entering through 3 at temperatures of from 175 to 180° F. exits through 2 at increasing temperatures as the reaction progresses. Thus, the exiting temperature rises rapidly to 200° F. after 25 minutes of operation. The heated acid returns to tank 4 where it heats the liquor in the tank so that it rises in temperature to about 178° F. from an initial temperature of 175° F. degrees.

Thereafter, the exothermic heat of the reaction falls so that the temperature of the exiting liquor falls but is still hotter than the inlet temperature. The temperature of the acid in tank 4 thus rises gradually and a point is reached after about 50 minutes of reaction when the exit temperature and the inlet temperature is about 185° F. At this point, the temperature in the tank is gradually raised by steam, as the curves indicate, until a temperature of about 215° F. is reached after about 175 minutes of operation and this temperature is maintained throughout the operation. It will be observed that the inlet and outlet temperatures are substantially equal after about 50 minutes of operation and remain so, or substantially so, throughout the operation. It will, of course, be realized by those skilled in the art that radiation, flow rates, heating rates, and temperature losses due to radiation and evaporation, will alter the results and that the figures given above are for purposes of explanation and illustration.

As shown in curve C, the acid concentration dropped gradually from about 14.75% at the start of the operation to about 12% at the end of the operation.

Experience has shown that in such an operation where acid of the above concentrations and concentration range is employed in a process such as is described above, the acid will have a boiling point of about 220° F. which does not change materially throughout the run. The temperature shown in curves A and B are thus at all times below the boiling point of the acid used.

While the rate of change in acid concentration can not be taken directly as a measure of the relative rate of acid consumption at various stages of the reaction, since the concentration is affected by evaporation losses from tank 4 on the one hand and dilution by condensed steam on the other, it is evident, however, that during the last half of the reaction, i. e., for about 150 to 300 minutes the rate of neutralization of acid is small.

However, this prolongation of reaction time has been found desirable in order to increase the silica content so that when fired, as described below, the silica content of the fiber will be that desired for the service to be rendered. This is usually greater than about 9 parts by weight of $SiO_2$ to 1 part by weight of non-siliceous oxides, and preferably more than 95% by weight of $SiO_2$. When used as batts in insulating blankets for jet motors, silica content of about 97.5% has been found acceptable. Experience has shown that heating at a temperature of 215° F. for about 150 minutes to give a total reaction time of about 300 minutes as shown in the above example is required to leach the E fiber to this degree of $SiO_2$ content as in the examples given.

After the leaching is completed, the acid is drained from the tank through pipe 10 and pumped into tank 4. Water may then be circulated through pump 19, line 23 and through spray 3 and tank 1 and pumped through line 14 and valve 15, appropriate valves to be adjusted for this purpose. Washing is continued until the wash liquor in line 2 is substantially free of chlorides, which indicates sufficient washing for this purpose.

The fiber is thus removed from the tank 1 by lifting the bag from tank 1 and felted as described in the Parker Patent, 2,635,390.

The above procedure may be repeated with a new batch of fiber placed in tank 1 and processed in the same manner. The acid in tank 4 may be reused by fortifying the acid in tank 4 with fresh acid to reestablish the initial concentration. Thus, for example, where we start with 14.75% acid and end up with 12% acid, for this purpose, we withdraw about 15% of the volume in the tank and fortify it with an equal volume of 33% HCl acid solution. The procedure described above may then be repeated. However, the salt concentration rises in the acid and after a number of cycles, as described above, the dilution with fresh acid described above is not sufficient and the rate of leaching in tank 1 falls to an uneconomic level. Experience has shown that 6 cycles, i. e., six batches of fiber treated, with acid fortified as above, is economical. Therefore, at the end of the sixth batch we discard the entire tank full of acid through line 8.

The duration of leaching indicated above for the fibers and the acid concentration and temperature cycle indicated is sufficient to produce a leached fiber which, when dried at a temperature of 180° F. and then heated to a temperature of about 1800° F. for 8 hours, yields a fiber of about 98% $SiO_2$.

While we have in the foregoing described a batch process, we may continually bleed some of the neutralized acid via line 14 and replace it with fresh acid introduced through line 17 into line 13. The fraction of the acid to be discarded via line 14 and replaced by acid via line 17 will depend on the acid and salt concentration level desired to be maintained in tank 4 and the concentration of acid and salt in the acid circulating via pump 10 and the concentration of acid injected via line 17. By proportioning the fraction described and the volume of acid and its concentration introduced via 17 modified by any addition of water through 21 as desired, the acid and salt concentration may be maintained in tank 4 so that a fairly constant acid concentration may be maintained throughout any one run and through successive runs.

While we have described a batch operation in tank 1, we may employ a number of parallel tanks 1, one being used while another is being discharged and while another is being charged. We may also use, instead of a single tank such as 1, a number of tanks in cascade arrangement so that the discharge from one of the tanks may be used to act as the feed to the following tank. The tanks may contain fibers in successive stages of high degrees of leaching and so arranged as to permit the cutting out of the tank with the fibers leached to the desired degree so that it may be recharged with fresh fibers and made the initial member of the cascade arrangement.

The fibers produced in the operation described above are in the form of hydrated silica such as is produced in the patents referred to above.

The fibers may be used for many purposes as in their dry form, i. e., without heating to a high temperature for dehydration of the hydrated silica as described above. The fibers, either as produced by the leaching step or after drying below about 212° F., may be used to make paper or batts by any procedure desired or used as reenforcement in plastics or other materials either as so dried or after dehydrated in firing at the elevated temperature. They may be felted preferably in their hydrated silica form by any desired procedure such as is described in the above Parker Patent 2,635,390.

While we have described a particular embodiment of our invention for the purpose of illustration, it should be understood that various modifications and adaptations thereof may be made within the spirit of the invention as set forth in the appended claims.

We claim:

1. A process for leaching siliceous glass fiber to form silica fibers which comprises establishing a bed of glass fibers, flowing an aqueous acid solution through said bed, withdrawing acid from said bed, maintaining the temperature of the acid entering said bed at a lower temperature than the temperature of the acid existing from the bed, and maintaining the temperature of the acid exiting from the bed below the boiling point of the aqueous solution of the acid.

2. In the process of claim 1, recirculating acid withdrawn from the bed back to the bed of fiber and continuing the said circulation until the temperature of the acid withdrawn from the bed is substantially the temperature of the acid introduced into the bed, thereafter heating the acid withdrawn from the bed to a more elevated temperature but less than the boiling point of the acid and circulating the acid at said more elevated temperature back to the bed while withdrawing the acid from said bed at a temperature not greater than the temperature of the acid entering the bed and less than the boiling temperature of said acid and continuing the said circulation until the weight ratio of silica to non-siliceous oxides in the fiber is above about 9 measured on a water-free basis.

3. A process for leaching siliceous glass fiber to form silica fibers which comprises establishing a bed of glass fibers, flowing an aqueous solution of hydrochloric acid through said bed, withdrawing acid from said bed, maintaining the temperature of the acid entering said bed at a lower temperature than the temperature of the acid exiting from the bed, and maintaining the temperature of the acid exiting from the bed below the boiling point of the aqueous solution of hydrochloric acid.

4. In the process of claim 1, recirculating an aqueous solution of hydrochloric acid withdrawn from the bed back to the bed of fiber and continuing the said circulation until the temperature of the acid withdrawn from the bed is substantially the temperature of the acid introduced into the bed, thereafter heating the acid withdrawn from the bed to a more elevated temperature but less than the boiling point of the acid and circulating the acid at said more elevated temperature back to the bed while withdrawing the acid from said bed at a temperature not greater than the temperature of the acid entering the bed and less than the boiling temperature of said acid and continuing the said circulation until the weight ratio of silica to non-siliceous oxides in the fiber is above about 9 measured on a water-free basis.

5. A process for leaching siliceous glass fiber with an aqueous acid solution which comprises flowing the aqueous solution through a compact bed of fiber, maintaining the volume ratio of acid solution to glass fiber in contact with said bed in the range of from about 10 to about 1, removing the aqueous solution from said bed and continuing said circulation to convert the glass fiber into fiber-containing silica hydrate, the weight ratio of $SiO_2$ to non-siliceous oxides being in excess of 9 to 1.

6. A process for leaching siliceous glass fiber with an aqueous acid solution which comprises flowing aqueous acid solution at an elevated temperature through a bed of glass fiber at a bulk density in the range of from about 15 to 25 pounds per cubic foot, leaching said fiber, compressing said partially leached glass fiber to a bulk density in the range of from about 30 to 50 pounds per cubic foot, and continuing the passage of acid solution through said compressed fiber until the weight ratio of silica to non-siliceous oxides in the fiber is in excess of 9 to 1.

7. A process for leaching siliceous glass fiber to form hydrated silica fiber which comprises establishing a bed of wetted glass fiber at a bulk density in the range of from about 15 to 25 pounds per cubic foot, flowing hydrochloric acid solution at a temperature below boiling into and through the said bed, heating said acid by the heat of reaction of the acid and fiber, withdrawing said heated acid from said bed at a temperature below the boiling point of the acid, cooling said acid, compacting said bed to a bulk density in the range of from about 30 to 50 pounds per cubic foot, further introducing acid into said bed at a temperature below boiling and withdrawing acid from said bed at not more than said last named temperature, heating said withdrawn acid to a temperature below boiling acid and introducing said heated acid into said compacted bed, and continuing said passage of acid to produce a fiber containing silica in a weight ratio to non-siliceous oxide of more than about 9 to 1.

References Cited in the file of this patent

UNITED STATES PATENTS

| | | |
|---|---|---|
| 2,491,761 | Parker | Dec. 20, 1949 |
| 2,686,954 | Parker | Aug. 24, 1954 |